US009581712B2

(12) United States Patent
Brookes et al.

(10) Patent No.: US 9,581,712 B2
(45) Date of Patent: Feb. 28, 2017

(54) METHODS AND SYSTEMS FOR CONDUCTING RECONNAISSANCE MARINE SEISMIC SURVEYS

(71) Applicant: ION Geophysical Corporation, Houston, TX (US)

(72) Inventors: David Brookes, Houston, TX (US); Nikolaos Bernitsas, Houston, TX (US); Paul Farmer, Houston, TX (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 14/711,154

(22) Filed: May 13, 2015

(65) Prior Publication Data

US 2015/0331127 A1 Nov. 19, 2015

Related U.S. Application Data

(60) Provisional application No. 61/994,015, filed on May 15, 2014.

(51) Int. Cl.
*G01V 1/38* (2006.01)
*G01V 1/36* (2006.01)
*G01V 1/18* (2006.01)

(52) U.S. Cl.
CPC .............. *G01V 1/3808* (2013.01); *G01V 1/18* (2013.01); *G01V 1/36* (2013.01); *G01V 1/3817* (2013.01); *G01V 2210/1423* (2013.01); *G01V 2210/50* (2013.01)

(58) Field of Classification Search
CPC ................................ G01V 1/38; G01V 1/3808
USPC ............................................................ 367/16
See application file for complete search history.

(56) References Cited

U.S. PATENT DOCUMENTS

| 3,806,863 | A | 4/1974 | Tilley et al. |
| 6,456,565 | B1 | 9/2002 | Grall et al. |
| 2008/0285381 | A1* | 11/2008 | Moldoveanu et al. ......... 367/20 |
| 2010/0008184 | A1* | 1/2010 | Hegna et al. .................. 367/21 |
| 2011/0044127 | A1 | 2/2011 | Kostov et al. |
| 2011/0261646 | A1 | 10/2011 | MacNeill et al. |
| 2011/0283797 | A1 | 11/2011 | Manin |
| 2011/0305106 | A1* | 12/2011 | Eick .................... G01V 1/3826 367/17 |
| 2012/0069702 | A1 | 3/2012 | Muyzert et al. |

(Continued)

FOREIGN PATENT DOCUMENTS

| EP | 2620789 | * | 7/2013 | ............... G01V 1/38 |
| EP | 2620789 A2 | | 7/2013 | |
| WO | 2009143579 A1 | | 12/2009 | |

OTHER PUBLICATIONS

International Search Report for International Application No. PCT/US2015/030750 dated Sep. 24, 2015 from the European Patent Office.

(Continued)

*Primary Examiner* — Luke Ratcliffe
(74) *Attorney, Agent, or Firm* — Holland & Hart LLP (57) ABSTRACT

Methods, systems, and apparatuses are disclosed for conducting reconnaissance marine seismic surveys. In one example method of acquiring a marine seismic survey, a plurality of streamers are towed behind an acquisition vessel, the plurality of streamers defining a swath. An independent source is towed by an independent source vessel above one or more of the plurality of towed streamers.

29 Claims, 10 Drawing Sheets

(56) References Cited

U.S. PATENT DOCUMENTS

2013/0114373 A1* 5/2013 Mandroux et al. ............. 367/16
2013/0135966 A1 5/2013 Rommel et al.
2013/0188448 A1 7/2013 Siliqi et al.

OTHER PUBLICATIONS

Patents Act 1977: Search Report under Section 17 for Application No. GB1508430.4, dated Nov. 9, 2015 from the UK Intellectual Property Office.

* cited by examiner

METHODS AND SYSTEMS FOR CONDUCTING RECONNAISSANCE MARINE SEISMIC SURVEYS

CROSS REFERENCE TO RELATED APPLICATIONS

This application claims priority to and the benefit of U.S. provisional application No. 61/994,015, entitled "METHODS AND SYSTEMS FOR CONDUCTING RECONNAISSANCE MARINE SEISMIC SURVEYS," which was filed on May 15, 2014, and which is hereby incorporated by reference in its entirety for all purposes.

BACKGROUND

The present invention relates to seismic acquisition in general and, in particular, to methods and systems for conducting reconnaissance marine seismic surveys.

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers in order to create an image of the subsurface of the Earth.

Conventional marine seismic surveys generally involve towing one or more streamer cables with a plurality of receivers behind an acquisition vessel. Each receiver includes, for example, a pressure sensor and/or a particle motion sensor in proximity to one another. The pressure sensor may be, for example, a hydrophone that records scalar pressure measurements of a seismic wavefield. The particle motion sensor may be, for example, a three-component geophone that records vectorial velocity measurements of the seismic wavefield. By observing the reflected seismic wavefield detected by the receiver(s) during the survey, the geophysical data pertaining to reflected signals may be acquired and these signals may be used to form an image indicating the composition of the Earth near the survey location.

It can be very expensive to acquire and process the data collected in towed-streamer marine seismic surveys. The acquisition can be expensive because of the large amount of equipment and coordination required to plan and carry out a towed-streamer survey. Conventional 3D towed-streamer acquisition geometries typically include 5-15 streamers towed, together with one or more sources, behind an acquisition vessel, with the streamers spaced at 50-100 meters and towed at a depth of about 10 meters. The vessels usually tow the streamers in a "racetrack" geometry, with swaths defined by the streamers overlapping by 50% or more in successive acquisition lines. In many cases, the reason for such large overlap is because of the relatively sparse coverage in the near offset range (i.e., for the receivers closest to the vessel and source) that needs to be infilled in subsequent acquisition lines.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Features generally relating to one or more improved systems, methods, and/or apparatuses for conducting marine reconnaissance seismic surveys are described. In FIGS. 1A to 11, various acquisition geometries are described for acquiring relatively sparse seismic data in a first, so-called reconnaissance seismic survey. A reconnaissance seismic survey may be an initial exploration survey acquired at a relatively lower cost and/or in a relatively faster manner (as compared with traditional narrow or wide azimuth seismic surveys). As described in FIGS. 1A to 11, the data from one or more of these reconnaissance seismic surveys may be used to target further, more detailed seismic surveys, and the data from the initial, reconnaissance survey may optionally be combined with the data from the second, more detailed survey to process the seismic data in forming, for example, a subsurface image. However, in other embodiments, data from a reconnaissance survey may be used alone and independent of data from any other surveys.

Various embodiments described herein may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1A:
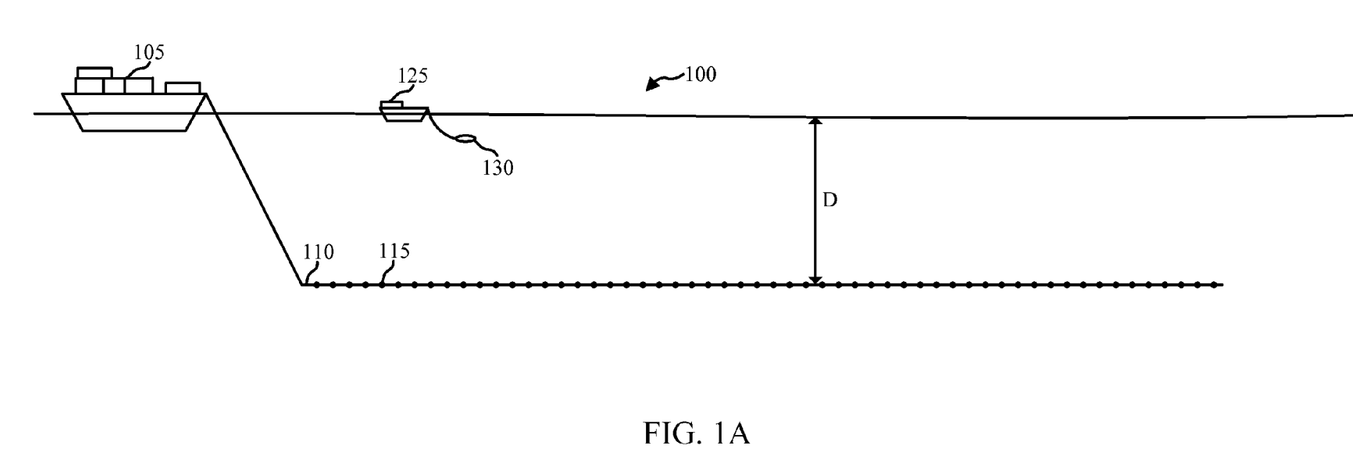
FIGS. 1A and 1B are simplified diagrams of a reconnaissance marine seismic survey system, in accordance with various embodiments.
Figure 1B:
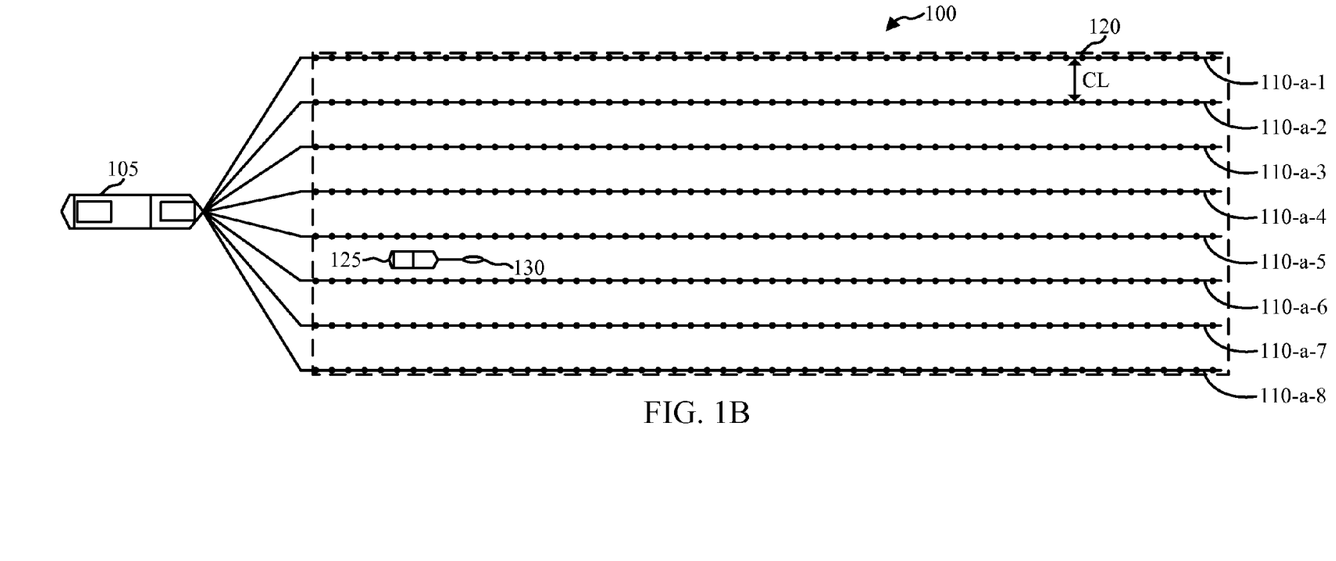

Referring first to FIGS. 1A and 1B, one example of a marine seismic acquisition system 100 suitable for reconnaissance seismic surveys is shown, including an acquisition vessel 105 towing a plurality of streamers 110. Each of the streamers 110 includes a plurality of receivers 115, and each of the receivers 115 includes one or more sensors, such as a pressure sensor or a particle motion sensor. As shown in FIG. 1A, the streamers 110 may be towed at a depth D that is deeper than in conventional towed streamer surveys. For example, the streamers 110 may be towed at a depth of 20-30 meters. In some embodiments, the streamers 110 may be variable depth or slanted streamers, with the receivers 115 on a single streamer being towed at a plurality of different depths.

An independent source vessel 125 tows an independent source 130 above one or more of the towed streamers 110. The independent source vessel 125 tows the independent source 130 above the one or more towed streamers 110 in that the source 130 is positioned over one or more portions of one or more of the streamers 110 in the vertical dimension of the water column. In this manner, at different points during the survey, the source 130 may be positioned directly over various receivers 115 of the streamers 110, thus allowing for zero-offset and near-offset measurements to be made corresponding to the source 130. It will be appreciated that the streamers 110 are generally towed at a depth D that operationally allows for the independent source vessel 125 and the source 130 to be towed above the streamers 110 without tangling or causing other overlapping problems. Hence, as mentioned above, the streamers 110 may be towed at a depth D of, for example, 20-30 meters.

In some embodiments, and as shown in FIGS. 1A and 1B, the independent source 130 replaces an acquisition-vessel source (or sources) conventionally towed by the acquisition vessel 105. By eliminating the source(s) conventionally towed by the acquisition vessel 105, the streamers 110 may be able to be towed with greater crossline offset spacing than in conventional towed streamer seismic surveys (i.e., a wider overall swath width of the streamers 110 may be achieved). This is illustrated in FIG. 1B, in which the streamers 110-a-1, 110-a-2, 110-a-3, 110-a-4, 110-a-5, 110-a-6, 110-a-7, 110-a-8 have a relative sparse crossline offset CL—which may be, for example, approximately 150 meters between each adjacent pair of streamers 110-a-1, 110-a-2, 110-a-3, 110-a-4, 110-a-5, 110-a-6, 110-a-7, 110-a-8. However, it will also be appreciated that in some embodiments of the present disclosure, the acquisition vessel 105 may still tow one or more acquisition-vessel sources. Also, it will be understood that 150 meters is merely one example of crossline offset CL spacing that may be used, and that the crossline offset CL spacing between the streamers may be more or less than this, including traditional, narrow crossline offset CL spacing. Also, while eight streamers 110-a-1, 110-a-2, 110-a-3, 110-a-4, 110-a-5, 110-a-6, 110-a-7, 110-a-8 are shown in FIG. 1B, this is merely illustrative, and more or fewer streamers may be towed by the acquisition vessel 105.

Still referring to FIG. 1B, the plurality of streamers 110-a-1, 110-a-2, 110-a-3, 110-a-4, 110-a-5, 110-a-6, 110-a-7, 110-a-8 may define a swath 120, which is the overall width of the streamers 110-a-1, 110-a-2, 110-a-3, 110-a-4, 110-a-5, 110-a-6, 110-a-7, 110-a-8. More specifically, the swath 120 may be defined in some embodiments as the width between the leftmost and rightmost receiver 115 on the streamers 110-a-1, 110-a-2, 110-a-3, 110-a-4, 110-a-5, 110-a-6, 110-a-7, 110-a-8 when towed over a given subsurface region. It is generally understood that the swath 120 may be wider or narrower than the coverage of Common MidPoint (CMP) bins in the subsurface region—in other words, the width of well-covered subsurface portions maybe wider or narrowed than the width of the streamers.

While FIGS. 1A and 1B show a single independent source vessel 125 towing a single independent source 130, in other embodiments, including several described below, multiple independent source vessels may tow multiple independent sources (i.e., one or more additional independent source vessels may tow one or more respective additional independent sources above the one or more towed streamers). Also, in some embodiments, each independent source vessel (including in those embodiments with only a single independent source vessel) may tow two or more independent seismic sources. In those embodiments where a plurality of independent sources are towed by either one or a plurality of independent source vessels, the independent sources may be towed at the same or at different depths. So, as just one example, if a first independent sources is towed at a depth of 5 meters, a second independent source may be towed at a depth of 12 meters. Towing multiple independent sources 130 over the streamers 110 may provide several different advantages. For example, the multiple sources 130 may provide a greater diversity of CMP coverage data because of the greater number of source-receiver pairs available. Multiple sources 130 may also allow one of the sources to be taken temporarily out of service (e.g., if the source 130 is malfunctioning or needs service) while the other sources 130 continue to operate. In some embodiments, the sail paths of the remaining sources 130 may need to be adjusted to account for the source 130 that was taken out of service. It will be appreciated that by allowing additional sources 130 to continue to operate even after one source 130 is taken out of service may improve the overall availability of the system 100 to continue to acquire seismic data—because, for example, if only a single source was used and that single source is taken offline, the acquisition may need to be stopped until the single source returns to service. Nonetheless, in some instances, only a single source 130 may be used, as illustrated in FIGS. 1A and 1B.

Figure 2A:
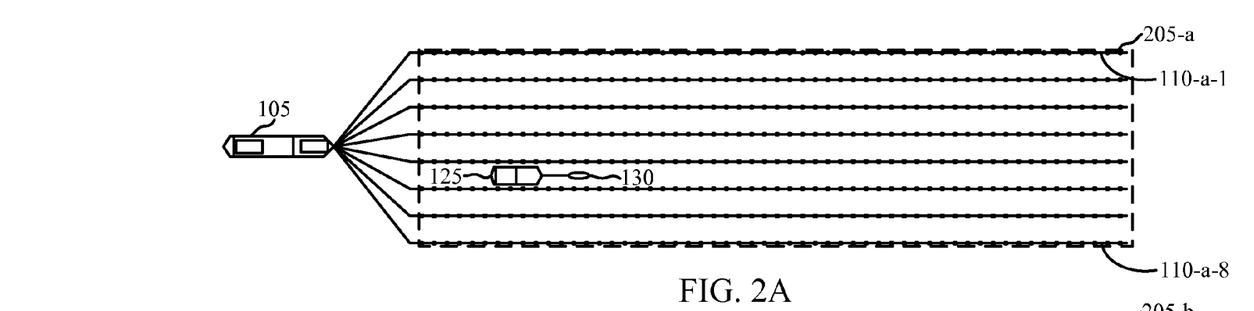
FIGS. 2A, 2B, and 2C are simplified diagrams of a reconnaissance marine seismic survey system, in accordance with various embodiments.
Figure 2B:
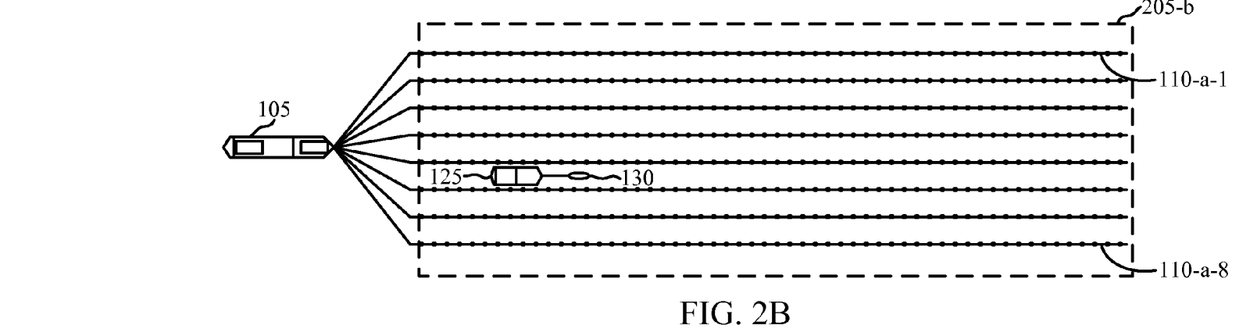
Figure 2C:
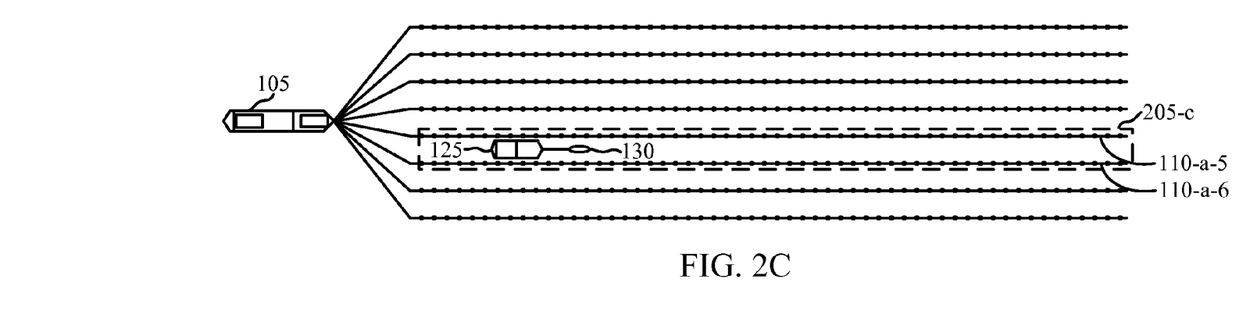

In some embodiments, the independent source vessel 125 (and hence the independent source 130 as well) may undulate as it is towed above the streamers 110. To help understand the region over which the independent source vessel 125 and independent source 130 may undulate, FIGS. 2A-2C illustrate various source navigation regions 205-a, 205-b, 205-c. The source navigation regions 205-a, 205-b, 205-c illustrated in FIGS. 2A-2C generally define the width, and in some cases the length, of the area over which the independent source vessel 125 and/or the independent source 130 undulate. Of course, in other embodiments, the independent source vessel 125 may not undulate, but may follow a relatively straight sail line, similar to the sail line of the acquisition vessel 105, or generally may move within a defined source navigation region in any manner, including in a pseudorandom pattern, a pattern of moving back and forth, crooked lines, and so forth.

In FIG. 2A, the source navigation region 205-*a* is approximately aligned with the swath defined by the streamers 110-*a*-1, 110-*a*-2, 110-*a*-3, 110-*a*-4, 110-*a*-5, 110-*a*-6, 110-*a*-7, 110-*a*-8—more specifically, the left and right (or outer) sides of the source navigation region 205-*a* are generally aligned with the respective left and right (or outer) sides of the swath defined by the leftmost streamer 110-*a*-8 and the rightmost streamer 110-*a*-1. In FIG. 2B, the left and right (or outer) sides of the source navigation region 205-*b* extend beyond the respective left and right (or outer) sides of the swath defined by the streamers 110-*a*-1, 110-*a*-2, 110-*a*-3, 110-*a*-4, 110-*a*-5, 110-*a*-6, 110-*a*-7, 110-*a*-8. In FIG. 2C, the left and right (or outer) sides of the source navigation region 205-*c* are approximately aligned with a sub-swath defined by a subset of the plurality of streamers—specifically in FIG. 2C, the left and right sides of the source navigation region 205-*c* are approximately aligned with the streamers 110-*a*-5 and 110-*a*-6, respectively. In describing the source navigation regions 205-*a*, 205-*b*, 205-*c*, left and right are used here to refer to the crossline width of the streamers with a view towards the acquisition vessel 105. Also, while FIGS. 2A-2C illustrate three examples of source navigation regions 205-*a*, 205-*b*, 205-*c*, these are provided as examples only, and it will be understood that other source navigation regions may be defined—including for example source navigation regions spanning different subswaths and so forth.

As mentioned above, in some embodiments, the independent source vessel 125 and the independent source 130 undulate within the source navigation region. Understanding the different source navigation regions 205-*a*, 205-*b*, 205-*c* possible from FIGS. 2A-2C, and now turning to FIGS. 3A-3G, the undulation pattern of the independent source vessel(s) 125 (e.g., the pre-plotted course planned for the independent source vessels) and the independent source(s) 130 will now be described. The source navigation region 205 in FIGS. 3A-3G may be any of the source navigation regions 205-*a*, 205-*b*, 205-*c* illustrated in FIGS. 2A-2C or a different source navigation region altogether.

Figure 3A:
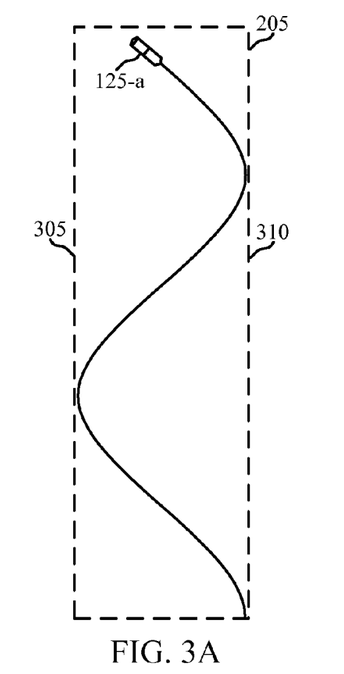
FIGS. 3A, 3B, 3C, 3D, 3E, 3F, and 3G are simplified diagrams of a reconnaissance marine seismic survey system, in accordance with various embodiments.

FIG. 3A illustrates a single independent source vessel 125-*a* (towing one or more independent sources—not shown) undulating between a left side 305 of the source navigation region 205 and the right side 310 of the source navigation region 205 in a substantially sinusoidal pattern. The independent source vessel 125-*a* advances in the same general direction as the acquisition vessel (not shown in FIG. 3A) as it undulates within the source navigation region 205. FIGS. 3B-3E similarly show one or more source vessels undulating within the source navigation region in a substantially sinusoidal pattern, although the number of independent source vessels, the spacing of the vessels, and the specific sinusoidal pattern followed vary in each figure.

Figure 3B:
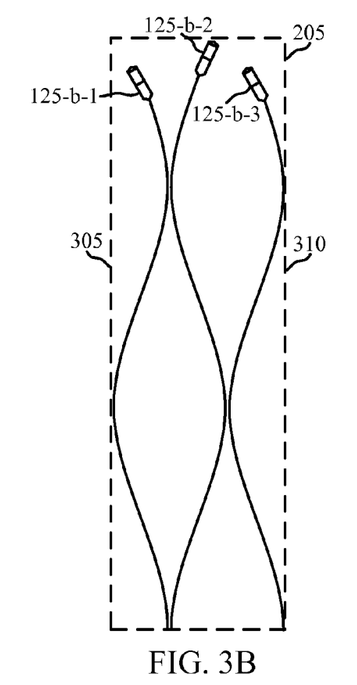

Taking FIG. 3B now, three independent source vessels 125-*b*-1, 125-*b*-2, 125-*b*-3 are shown undulating within the source navigation region 205, each in a substantially sinusoidal pattern. The first independent source vessel 125-*b*-1, however, undulates closer to the left side 305 than the second and third independent source vessels 125-*b*-2, 125-*b*-3, the third independent source vessel 125-*b*-3 undulates closer to the right side 310 than the first and second independent source vessels 125-*b*-1, 125-*b*-2, and the second independent source vessel 125-*b*-2 undulates between the first and third independent source vessels 125-*b*-1, 125-*b*-3 such that the paths of the three independent source vessels 125-*b*-1, 125-*b*-2, 125-*b*-3 substantially do not overlap. Stated differently, the three independent source vessels 125-*b*-1, 125-*b*-2, 125-*b*-3 each undulate in a sinusoidal pattern over respective first, second, and third substantially non-overlapping sub-source navigation regions. The non-overlapping of these sub-source navigation regions may reduce the risk of collision when multiple independent source vessels 125-*b*-1, 125-*b*-2, 125-*b*-3 are employed, as in FIG. 3B.

Figure 3C:
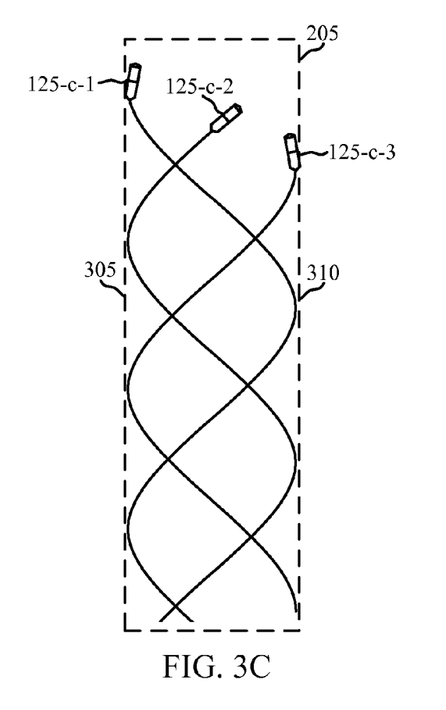
Figure 3D:
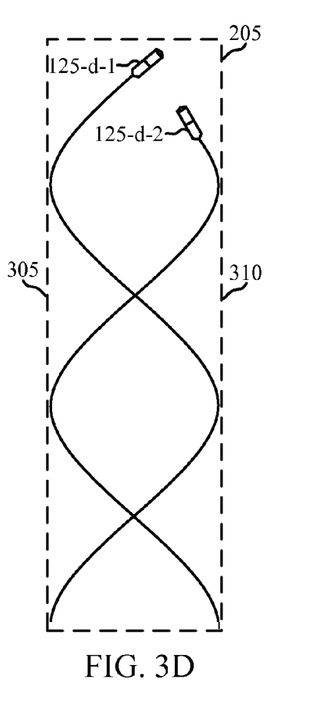
Figure 3E:
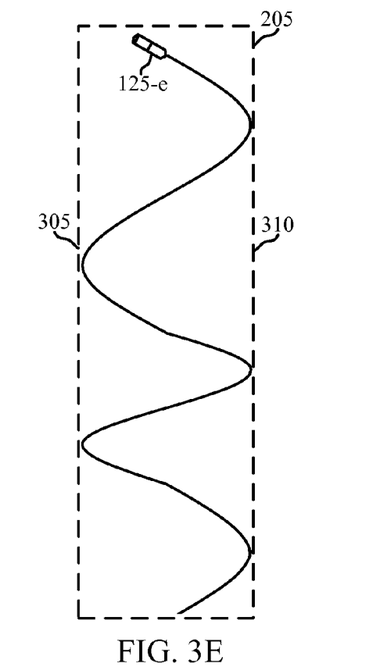

In FIG. 3C, three independent source vessels 125-*c*-1, 125-*c*-2, 125-*c*-3 all undulate between the left and right sides 305, 310 of the source navigation region 205, but are spaced such that the sinusoidal sail lines they traverse are substantially equally spaced, thereby creating a helix-like pattern of interwoven sinusoids. FIG. 3D is similar to FIG. 3C, except only two source vessels 125-*d*-1, 125-*d*-2 undulate between the left and right sides 305, 310 in spaced apart sail lines. In FIG. 3E, a single independent source vessel 125-*e* is shown, but the "frequency" of the sinusoidal undulation is not kept constant, and instead varies to give a greater diversity of source-receiver pairs in the data recorded.

Figure 3F:
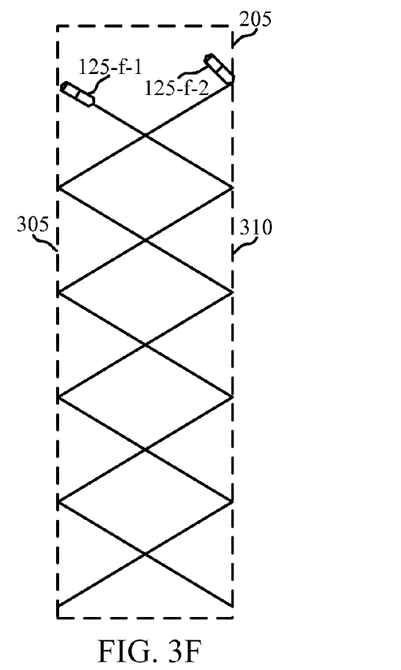
Figure 3G:
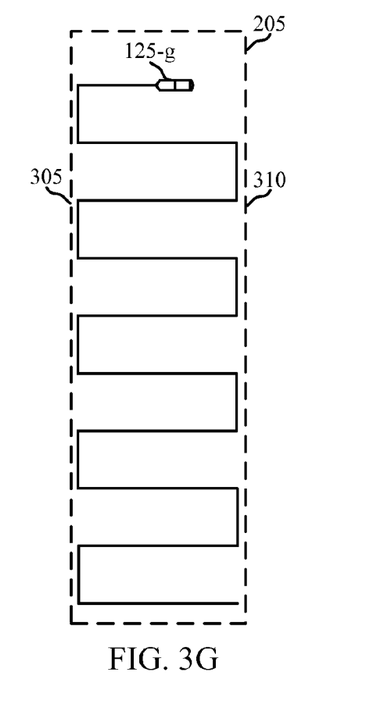

Referring now to FIGS. 3F and 3G, undulation patterns other than sinusoids are illustrated. In FIG. 3F, two independent source vessels 125-*f*-1, 125-*f*-2 undulate in a saw tooth pattern, and in FIG. 3G, a single independent source vessel 125-*g* undulates in a square wave pattern. it will thus be appreciated that the source vessels need not undulate in a sinusoidal pattern, but generally can undulate in any given manner. Further, as illustrated in FIG. 3E, the undulation pattern need not remain constant, but can vary as the independent source vessel advances in the same general direction as the acquisition vessel. In general, while FIGS. 3A-3G illustrate some examples of undulation patterns for one or more independent source vessels, it will be understood that there any many variations that are within the scope of the present disclosure. As one example of one such variation, consider that the pattern shown in FIG. 3E is generally a sinusoid with varying "frequency," but note that the "amplitude" of the undulation could also be varied (i.e., by having the independent source vessel not traverse all the way to the edges of the source navigation region on some turns, but all the way or beyond the edges on other turns). Also, note that the paths shown in FIGS. 3A-3G may be idealized paths for the independent source vessels to follow and that the actual paths followed may vary from those shown due to environmental factors (e.g., choppy water), navigational constraints (e.g., inaccuracies in navigation, a relatively large turn radius of the source vessels), and so forth.

Referring still to FIGS. 3A-3G, and also back to FIGS. 1A and 1B, the position of the independent source vessel(s) 125 relative to the acquisition vessel 105 will now be described. In some embodiments, the independent source vessel(s) 125 may be towed as close to the acquisition vessel 105 as operationally feasible in order to maximize the offset range of data acquired from the receivers 115 on the posterior end of the streamers. For example, the first independent source vessel may be towed no more than 500 meters following the independent source vessel, or may be towed a distance following the independent source vessel that is approximately one-half the width of the swath defined by the streamers (e.g., 800 meters). If more than one independent source vessel is used, each of the independent source vessels may be towed at different distances following the acquisition vessel in order to, for example, reduce the risk of collision and provide greater diversity of source-receiver pairs.

In other embodiments, however, the independent source vessel(s) 125 may be towed near the posterior end of the streamers 110 (e.g., with the last independent source vessel being towed no more than 500 meters from the posterior end of the streamers 110), which may again maximize the offset range of data acquired from the receivers 115, except in this case the far offsets would be the receivers 115 closest to the acquisition vessel.

Figure 4:
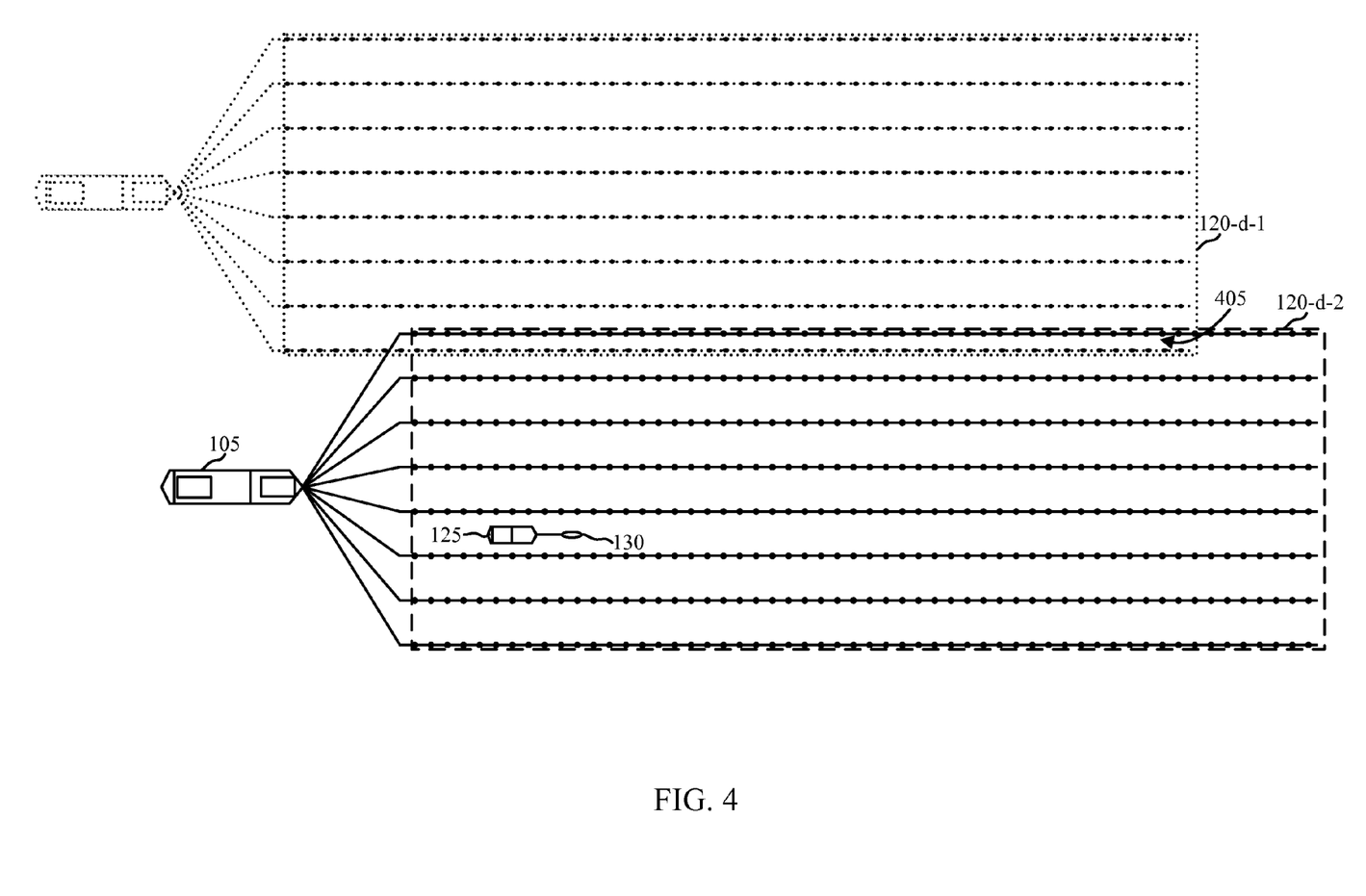
FIG. 4 is a simplified diagram of a reconnaissance marine seismic survey system, in accordance with various embodiments.

Turning now to FIG. 4, some of the benefits of acquiring a seismic survey as described in FIGS. 1A-3G will now be described. As shown in dotted lines in FIG. 4, a previous acquisition line in the same region was acquired, with the swath defined by the streamers from the previous pass shown as 120-d-1. In a subsequent acquisition line, the vessel 105 is again shown towing the streamers defining a second swath 120-d-2, with a spatial overlap region 405 shown between the first and second swaths 120-d-1, 120-d-2. In one embodiment, the width (in the crossline direction) of the spatial overlap region 405 may be no greater than 5, 10, 15, 20, 25, or 30% of the overall width (in the crossline direction) of one or both of the swaths 120-d-1, 120-d-2, or in other embodiments, there may be no overlap region and instead there may be a gap between the swaths 120-d-1, 120-d-2. The overlap between successive acquisition lines, if any, may be less than in conventional surveys because the diversity of data acquired from the undulating source vessels may provide enough data to regularize a seismic image using interpolation during the seismic data processing stage. In other words, by acquiring data as described above with reference to FIGS. 1A-3G substantial overlap (e.g., 50%) can be avoided during successive acquisition lines because of the diversity of source-receiver (including near offset coverage) data acquired by towing one or more independent source vessels over the one or more acquisition streamers.

Figure 5:
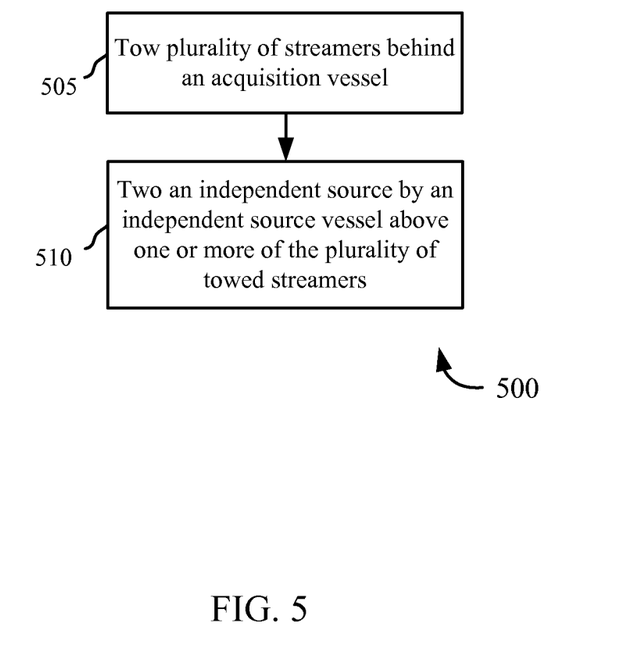
FIG. 5 is a flow chart illustrating a method of conducting a reconnaissance marine seismic survey, in accordance with various embodiments.

FIG. 5 is a flowchart illustrating a method 500 of acquiring seismic data using the system 100 shown in FIGS. 1A-4, in accordance with some aspects of the present disclosure. At block 505, a plurality of streamers are towed behind an acquisition vessel, with the plurality of streamers defining a swath. At block 510, one or more independent sources are towed by one or more respective independent source vessels above one or more of the plurality of streamers. As described above, the one or more independent source vessels may undulate within a defined source navigation region.

In another contemplated embodiment, a survey region encompassing a spread of ocean bottom cables or ocean bottom nodes (i.e., in place of the towed streamers described above) may be defined, and one or more independent sources may be towed by one or more independent source vessels in an undulating manner (e.g., as described above with reference to FIGS. 3A-3G) within a source navigation region, the source navigation region corresponding to one of a plurality of subregions within the survey region. In one example the subregions of the survey region may define a grid, with the grid including at least two subregions in its width dimension and at least two subregions in its height dimension. The grid and subregions may or may not be rectangular, and the subregions may or may not be equally sized. In some embodiments, each of the plurality of subregions of the survey region may be smaller than the overall survey region (e.g., less than 50%, 40%, 30%, 20%, 10%, 5% etc. the size of the overall survey region). The independent source vessel may undulate or move in any manner described above within the subregions, and the subregions may be less than a predefined width and a predefined length, each of which is smaller than the respective overall width and overall length of the survey region. The survey region may be aligned with the placement of the ocean bottom cables or ocean bottom nodes, or may extend outside the placement of such.

In some embodiments, the ocean bottom cables or the ocean bottom nodes may define a grid over which one or more independent source vessels may undulate. In these embodiments, the one or more independent source vessel may undulate over the grid defined by the ocean bottom nodes or the ocean bottom cable in that the independent source vessel traverses over the gridlines defined by the individual cables or nodes, rather than traversing along the gridlines defined by the cables or nodes. The traversing over the gridlines defined by the cables or nodes may be similar to any type of source vessel movement described above, including the undulations shown in FIGS. 3A-3G—for example, the independent source vessel may undulate back and forth between two gridlines (or generally any source navigation region based on the gridlines of the cables or nodes).

Figure 6:
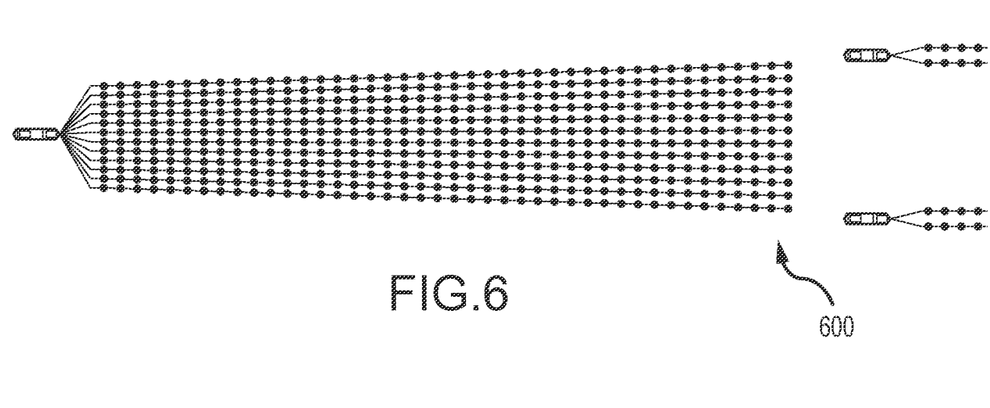
FIG. 6 is a simplified diagram of a reconnaissance marine seismic survey system, in accordance with various embodiments.
Figure 7:
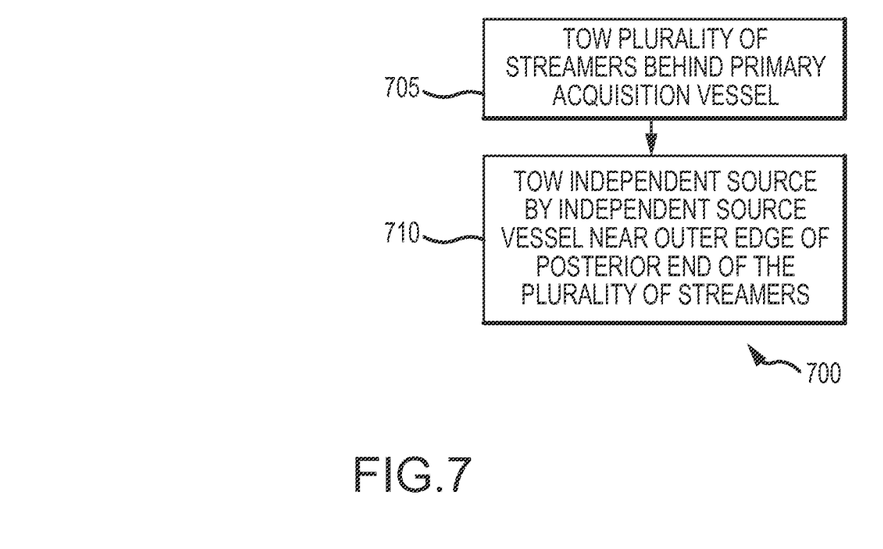
FIG. 7 is a flow chart illustrating a method of conducting a reconnaissance marine seismic survey, in accordance with various embodiments.

Referring now to FIG. 6, another example of an acquisition system 600 suitable for reconnaissance seismic surveys is shown, and in FIG. 7, a flowchart illustrating a method 700 of acquiring seismic data using the system 600 shown in FIG. 6 is shown, in accordance with some aspects of the present disclosure. At block 705, and as illustrated in FIG. 6, a plurality of streamers are towed behind a primary acquisition vessel, the plurality of streamers defining a primary swath. At block 710, and as illustrated in FIG. 6, an independent source is towed by an independent source vessel near an outer edge of a posterior end of the plurality of streamers.

Referring still to FIGS. 6 and 7, in some embodiments, the independent source may be a first independent source, the independent source vessel may be a first independent source vessel, and the outer edge may be a left-most streamer of the plurality of streamers, and the method 700 may further include towing a second independent source by a second independent source vessel near the posterior end of a right-most streamer of the plurality of streamers. The method 700 may also further include towing one or more streamers behind each of the first and second independent source vessels, and a length of the one or more streamers towed behind each of the first and second independent source vessels may be less than half a length of the plurality of streamers towed behind the primary acquisition vessel. For example, each of the one or more streamers towed behind each of the first and second independent source vessels may be no more than 2 kilometers long.

In some embodiments, at least one of the one or more streamer cables towed behind one of the first or second independent source vessels may be towed within the primary swath defined by the plurality of streamers towed by the primary acquisition vessel, and/or at least one of the one or more streamer cables towed behind one of the first or second independent source vessels may be towed outside of the primary swath defined by the plurality of streamers towed by the primary acquisition vessel. The plurality of streamer cables towed behind the primary acquisition vessel and the one or more streamer cables towed behind the first and second independent source vessels may in some embodiments all record data associated with the first independent source, the second independent source, and a third source associated with the primary acquisition vessel, and the data recorded by the one or more streamer cables towed behind the first and second independent source vessels may be used to provide near-offset coverage lacking in data recorded by the plurality of streamer cables towed behind the primary acquisition vessel.

In some embodiments, the plurality of streamers may be towed behind the primary acquisition vessel along a first sail line, the primary swath may be a first primary swath associated with the first sail line, and the method 700 may further include towing the plurality of streamers behind the primary acquisition vessel along a second sail line adjacent to the first sail line, thereby defining a second primary swath. The first and second primary swaths may spatially overlap by no more than 20%, or may substantially no overlap. The primary acquisition vessel may not be towed between the first and second sail lines.

In some embodiments, the posterior end of the plurality of streamers may be a free end of the streamers furthest away from the primary acquisition vessel. Also, the independent source may be towed 100 meters or more following the posterior end of the plurality of streamers, and/or may be towed adjacent to a left-most or right-most streamer of the plurality of streamers but ahead of the posterior end of the plurality of streamers.

In some embodiments, the independent source vessel may undulate between a leftmost edge of a source navigation region and a rightmost edge of the source navigation region. A source may be towed behind the primary acquisition vessel. In some embodiments, the plurality of streamers may be fanned out to form a wedge, or may be towed in straight lines parallel to one another.

In some embodiments, the independent source vessel may be towed within a predetermined distance from the outer edge of the posterior end of the plurality of streamers, with the predetermined distance being, for example, no more than 15% of an overall length of the plurality of streamers.

Figures 8, 9:
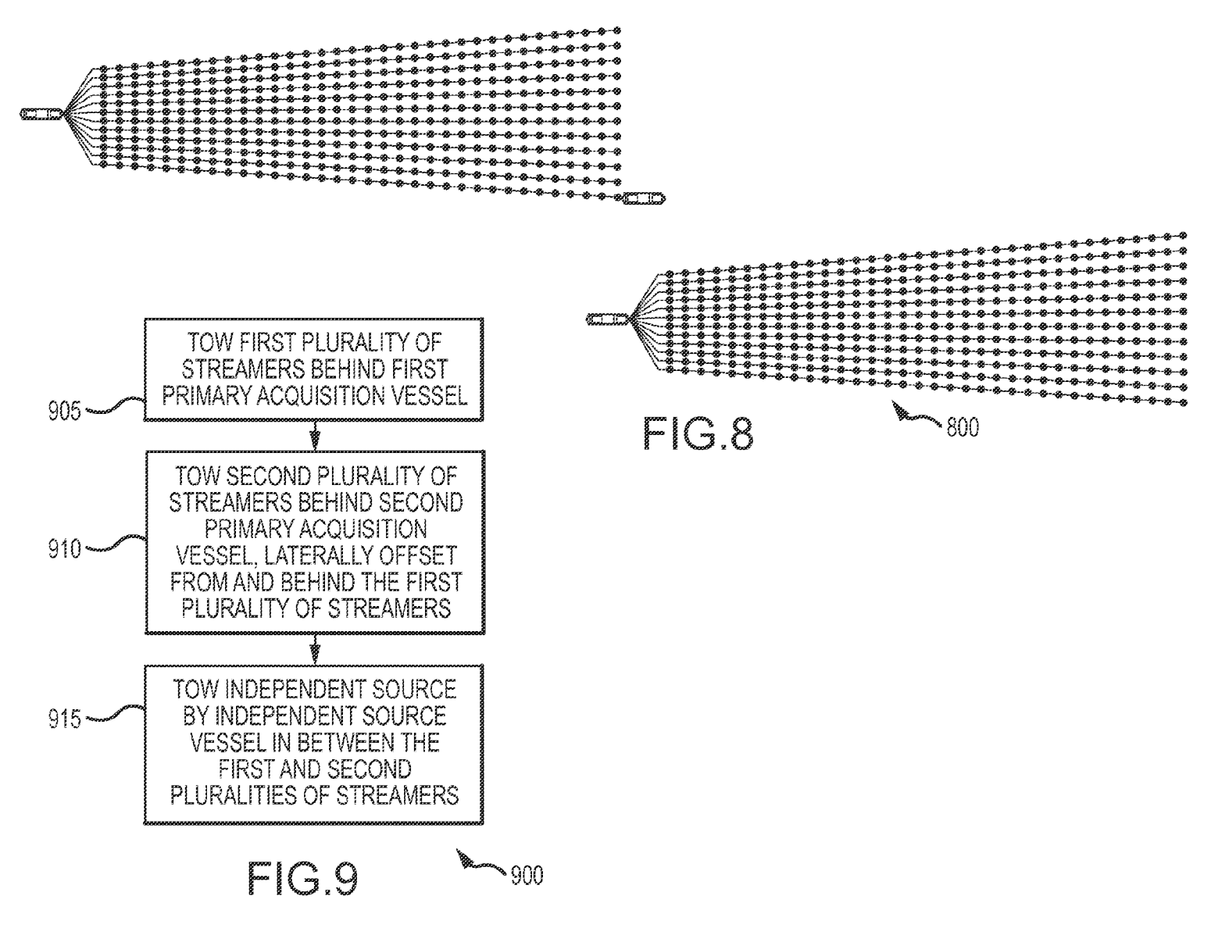
FIG. 8 is a simplified diagram of a reconnaissance marine seismic survey system, in accordance with various embodiments.
FIG. 9 is a flow chart illustrating a method of conducting a reconnaissance marine seismic survey, in accordance with various embodiments.

Referring now to FIG. 8, another example of an acquisition system 800 suitable for reconnaissance seismic surveys is shown, and in FIG. 9, a flowchart illustrating a method 900 of acquiring seismic data using the system 800 shown in FIG. 8 is shown, in accordance with some aspects of the present disclosure. At block 905, and as illustrated in FIG. 8, a first plurality of streamers are towed behind a first primary acquisition vessel. At block 910, and as illustrated in FIG. 8, a second plurality of streamers are towed behind a second primary acquisition vessel, the second plurality of streamers being towed laterally offset from and behind the first plurality of streamers. At block 915, and as illustrated in FIG. 8, an independent source may be towed by an independent source vessel in between the first plurality of streamers and the second plurality of streamers.

Referring still to FIGS. 8 and 9, in some embodiments, a bow of the second primary vessel may never advance ahead of a posterior end of the first plurality of streamers. Also, in some embodiments, the independent source may be towed behind a posterior end of the first plurality of streamers and/or ahead of a bow of the second primary vessel.

In some embodiments, the first plurality of streamers may be towed along a first sail line, the second plurality of streamers may be towed along a second sail line parallel to the first sail line, and the independent source vessel may undulate between the first and second sail lines as it advances. The first and second pluralities of streamers may be fanned out as they are towed behind the respective first and second primary acquisition vessels. The first and second pluralities of streamers may define a first combined swath as they are towed behind the first and second primary acquisition vessels along respective first and second sail lines, and the method 900 may further include towing the first and second pluralities of streamers behind the first and second primary acquisition vessels along respective third and fourth sail lines adjacent to the first and second sail lines, thereby defining a second combined swath, wherein the first and second combined swaths spatially overlap by no more than 12.5%, 15%, or 25%.

In some embodiments, the method 900 may further include towing a first acquisition-vessel source behind the first primary acquisition vessel and a second acquisition-vessel source behind the second primary acquisition vessel, and the first plurality of streamers may be towed along a first sail line, the second plurality of streamers may be towed along a second sail line parallel to the first sail line, and the independent source may be towed along a third sail line, with the third sail line being planned so as to provide near offset coverage missing from source-receiver pairs associated with the first and second acquisition-vessel sources. In some embodiments, this third sail line may be closer to first sail line than to the second sail line.

Figure 10:
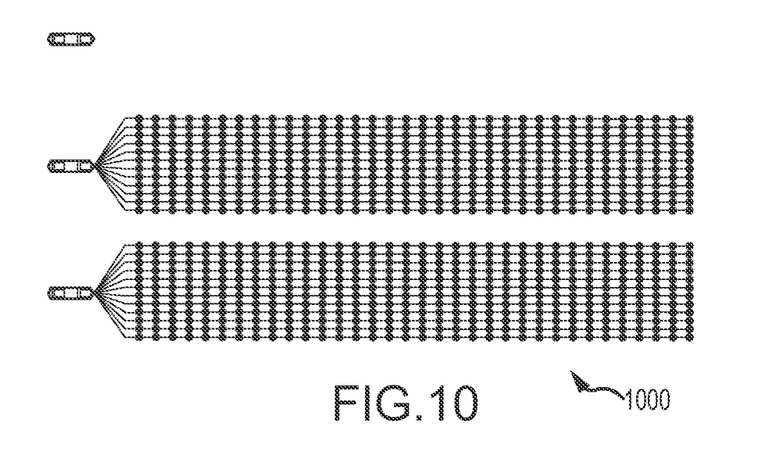
FIG. 10 is a simplified diagram of a reconnaissance marine seismic survey system, in accordance with various embodiments.
Figure 11:
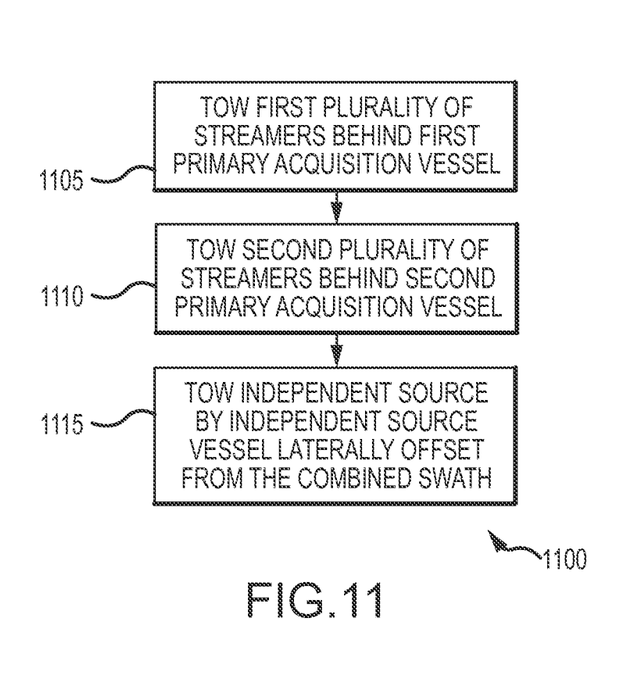
FIG. 11 is a flow chart illustrating a method of conducting a reconnaissance marine seismic survey, in accordance with various embodiments.

Referring now to FIG. 10, another example of an acquisition system 1000 suitable for reconnaissance seismic surveys is shown, and in FIG. 11, a flowchart illustrating a method 1100 of acquiring seismic data using the system 1000 shown in FIG. 10 is shown, in accordance with some aspects of the present disclosure. At block 1105, and as illustrated in FIG. 10, a first plurality of streamers are towed behind a first primary acquisition vessel. At block 1110, and as illustrated in FIG. 10, a second plurality of streamers are towed behind a second primary acquisition vessel, with the second plurality of streamers being substantially parallel to the first plurality of streamers, the first and second pluralities of streamers defining a combined swath. At block 1110, and as illustrated in FIG. 11, an independent source may be towed by an independent source vessel laterally offset from the combined swath.

Referring still to FIGS. 10 and 11, in some embodiments, the first and second primary acquisition vessels may advance abreast along respective first and second sail lines, and independent source vessel may also advance abreast of the first and second primary acquisition vessels along a third sail line. The first, second, and third sail lines may be substantially parallel to one another, and the second sail line may be substantially equidistant from the first and third sail lines. In other embodiments, the independent source vessel may advance along a third sail line ahead of the first and second primary acquisition vessels.

In some embodiments, the independent source vessel may undulate between the first and second sail lines, or generally in between any given two lines. The combined swath may be a first combined swath, and in some embodiments, the method 1100 may further include towing the first and second pluralities of streamers along respective third and fourth sail lines adjacent to the first and second sail lines, thereby defining a second combined swath, wherein the first and second combined swaths spatially overlap by no more than 10%, or do not substantially overlap at all.

In some embodiments, the first and second plurality of streamers may be towed as close together as operationally feasible—e.g., such that no more than 1500 meters separates a leftmost streamer of the first plurality of streamers and a rightmost streamer of the second plurality of streamers. Also, in some embodiments, the first plurality of streamers may be towed at a first depth and the second plurality of streamers may be towed at a second depth greater than the first depth so that the streamers are less likely to tangle (e.g., in case one primary acquisition vessel needs to cease acquisition while the other continues).

Referring now to the systems 100, 600, 800, 1000 and the associated methods described above with reference to FIGS. 1A-11, it will be appreciated that the systems 100, 600, 800, 1000 may be fit for the purpose of relatively sparse seismic data acquisition, with broad swaths, acceptable data quality, and regionally interpretable data, all achieved within a shorter timeframe and/or in a less costly manner than conventional towed streamer seismic surveys through the use of efficient acquisition geometries.

Figure 12:
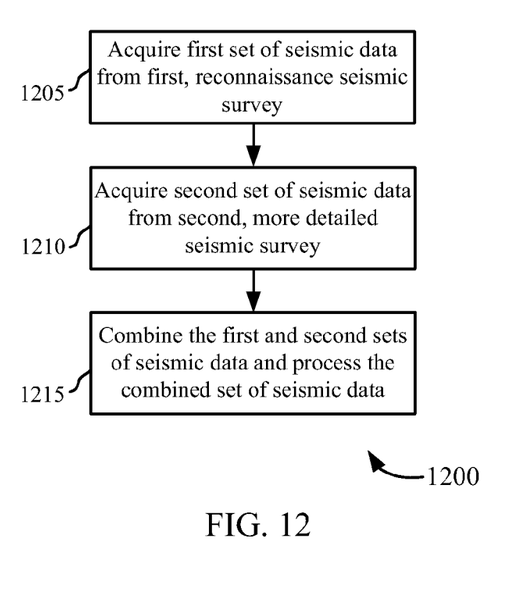
FIG. 12 is a flow chart illustrating a method of combining data from two different types of marine seismic surveys for processing, in accordance with various embodiments.

FIG. 12 is a flowchart illustrating a method in accordance with still additional aspects of the present disclosure. At block 1205 seismic data may be acquired in a first, reconnaissance-type seismic survey (using, for example, one of the systems 100, 600, 800, 1000 described above). At block 1210, additional seismic data may be acquired in a second, more detailed seismic survey, and at block 1215, the data from the first and second surveys may be combined, and the combined sets of data may be processed together (e.g., to form an image of the subsurface). In general, the first and second seismic surveys may differ in the crossline offset spacing of the streamers, in the speed of the acquisition vessel (and/or the independent source vessel, if any), and so forth.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of acquiring a marine seismic survey, comprising:
    towing a plurality of streamers behind an acquisition vessel, the plurality of streamers defining a swath of streamers; and
    towing an independent source by an independent source vessel above one or more of the plurality of towed streamers, wherein the independent source vessel moves back and forth between a left side of a source navigation region and a right side of the source navigation region so as to traverse at least a portion of the swath while advancing in a same general direction as the acquisition vessel.

2. The method of claim 1, wherein the independent source is a first independent source and the independent source vessel is a first independent source vessel, the method further comprising:
    towing one or more additional independent sources by one or more respective additional independent source vessels above the one or more of the plurality of towed streamers.

3. The method of claim 2, wherein the first independent source vessel and the one or more respective additional independent source vessels move between a left side of a source navigation region and a right side of the source navigation region over the one or more towed streamers.

4. The method of claim 3, wherein the first independent source vessel and the one or more respective additional independent source vessels undulate between the left side and the right side of the source navigation region over the one or more towed streamers.

5. The method of claim 3, wherein the first independent source vessel moves in a pseudorandom pattern over the one or more towed streamers.

6. The method of claim 3, wherein the one or more additional independent source vessels include a second independent source vessel and a third independent source vessel towing respective second and third independent sources, and the first independent source vessel undulates closer to the left side of the source navigation region than the second and third independent source vessels, and the third independent source vessel undulates closer to the right side of the source navigation region than the first and second independent source vessels.

7. The method of claim 2, wherein, upon the first independent source vessel being at least temporarily taken out of service, the one or more additional independent source vessels continue to operate.

8. The method of claim 7, further comprising adjusting sail paths for the one or more additional independent source vessels upon the first independent source vessel being taken out of service.

9. The method of claim 2, wherein at least one of the one or more additional sources are towed at a different depth than the first independent source.

10. The method of claim 1, wherein a plurality of receivers associated with each of the plurality of streamers are towed at variable depths so as to define respective slanted streamers.

11. The method of claim 1, wherein the acquisition vessel does not tow a source.

12. The method of claim 1, wherein the left and right sides of the source navigation region are approximately aligned with respective left and right sides of the swath defined by the plurality of towed streamers.

13. The method of claim 1, wherein the left and right sides of the source navigation region extend beyond respective left and right sides of the swath defined by the plurality of towed streamers.

14. The method of claim 1, wherein the left and right sides of the source navigation region are approximately aligned with a sub-swath defined by a subset of the plurality of towed streamers.

15. The method of claim 1, wherein the movement of the independent source vessel substantially follows an undulating sinusoidal pattern.

16. The method of claim 1, further comprising interpolating data acquired using the plurality of streamers to regularize a seismic image.

17. A non-transitory computer-readable medium storing computer-executable code for wireless communication, the code executable by a processor to:
 facilitate towing of a plurality of streamers behind an acquisition vessel, the plurality of streamers defining a swath of streamers; and
 facilitate towing of an independent source by an independent source vessel above one or more of the plurality of towed streamers, wherein the independent source vessel moves back and forth between a left side of a source navigation region and a right side of the source navigation region so as to traverse at least a portion of the swath while advancing in a same general direction as the acquisition vessel.

18. The non-transitory computer-readable medium of claim 17, wherein the independent source is a first independent source and the independent source vessel is a first independent source vessel, the code further executable by the processor to:
 facilitate towing of one or more additional independent sources by one or more respective additional independent source vessels above the one or more of the plurality of towed streamers.

19. The non-transitory computer-readable medium of claim 18, the code further executable by the processor to:
 facilitate movement of the first independent source vessel and the one or more respective additional independent source vessels between a left side of a source navigation region and a right side of the source navigation region over the one or more towed streamers.

20. The non-transitory computer-readable medium of claim 19, the code further executable by the processor to:
 facilitate the first independent source vessel and the one or more respective additional independent source vessels to undulate between the left side and the right side of the source navigation region over the one or more towed streamers.

21. The non-transitory computer-readable medium of claim 19, the code further executable by the processor to:
 facilitate movement of the first independent source vessel in a pseudorandom pattern over the one or more towed streamers.

22. The non-transitory computer-readable medium of claim 19, wherein the one or more additional independent source vessels include a second independent source vessel and a third independent source vessel towing respective second and third independent sources, the code further executable by the processor to:
 facilitate the first independent source vessel to undulate closer to the left side of the source navigation region than the second and third independent source vessels, and to facilitate the third independent source vessel to undulate closer to the right side of the source navigation region than the first and second independent source vessels.

23. The non-transitory computer-readable medium of claim 17, the code further executable by the processor to:
 interpolate data acquired using the plurality of streamers to regularize a seismic image.

24. A method of acquiring a marine seismic survey, comprising:
 towing a plurality of streamers behind an acquisition vessel, the plurality of streamers defining a swath of streamers;
 towing an independent source by an independent source vessel above one or more of the plurality of towed streamers such that the independent source is towed back and forth between a left side of a source navigation region and a right side of the source navigation region so as to traverse at least a portion of the swath as the independent source vessel advances in a same general direction as the acquisition vessel.

25. The method of claim 24, wherein the left and right sides of the source navigation region are approximately aligned with respective left and right sides of the swath defined by the plurality of towed streamers.

26. The method of claim 24, wherein the left and right sides of the source navigation region extend beyond respective left and right sides of the swath defined by the plurality of towed streamers.

27. The method of claim 24, wherein the left and right sides of the source navigation region are approximately aligned with a sub-swath defined by a subset of the plurality of towed streamers.

28. The method of claim 24, wherein the movement of the independent source vessel substantially follows an undulating sinusoidal pattern.

29. The method of claim 24, further comprising:
 interpolating data acquired using the plurality of streamers to regularize a seismic image.

\* \* \* \* \*